Sept. 12, 1961
H. R. BRUET
2,999,404
DRILLING AND THE LIKE ARRANGEMENT
FITTED ON A LATHE TAILSTOCK
Filed July 14, 1959
4 Sheets-Sheet 4
Fig:4
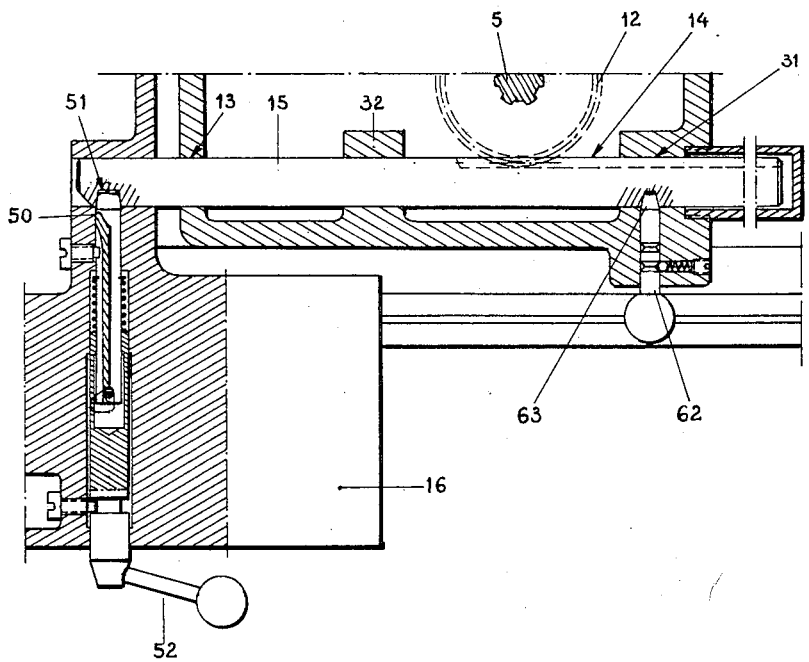
Fig:5
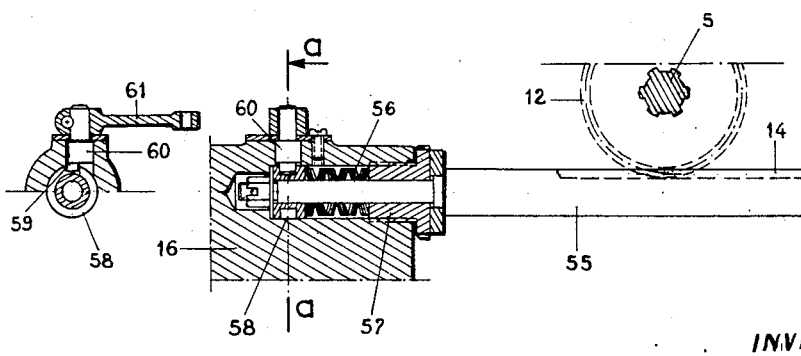
INVENTOR
HENRI RENÉ BRUET
By Linton and Linton
ATTORNEYS

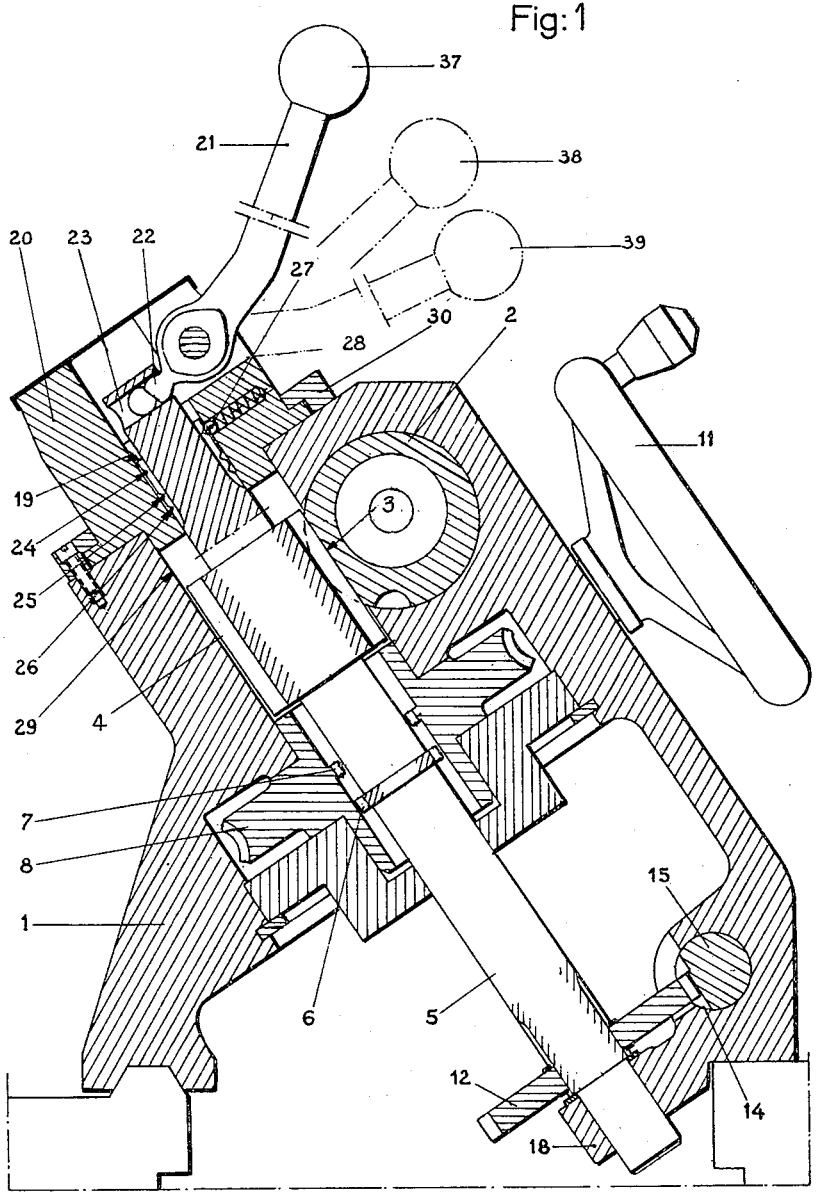
Fig:1
INVENTOR
HENRI RENÈ BRUET
By Linton and Linton
ATTORNEYS

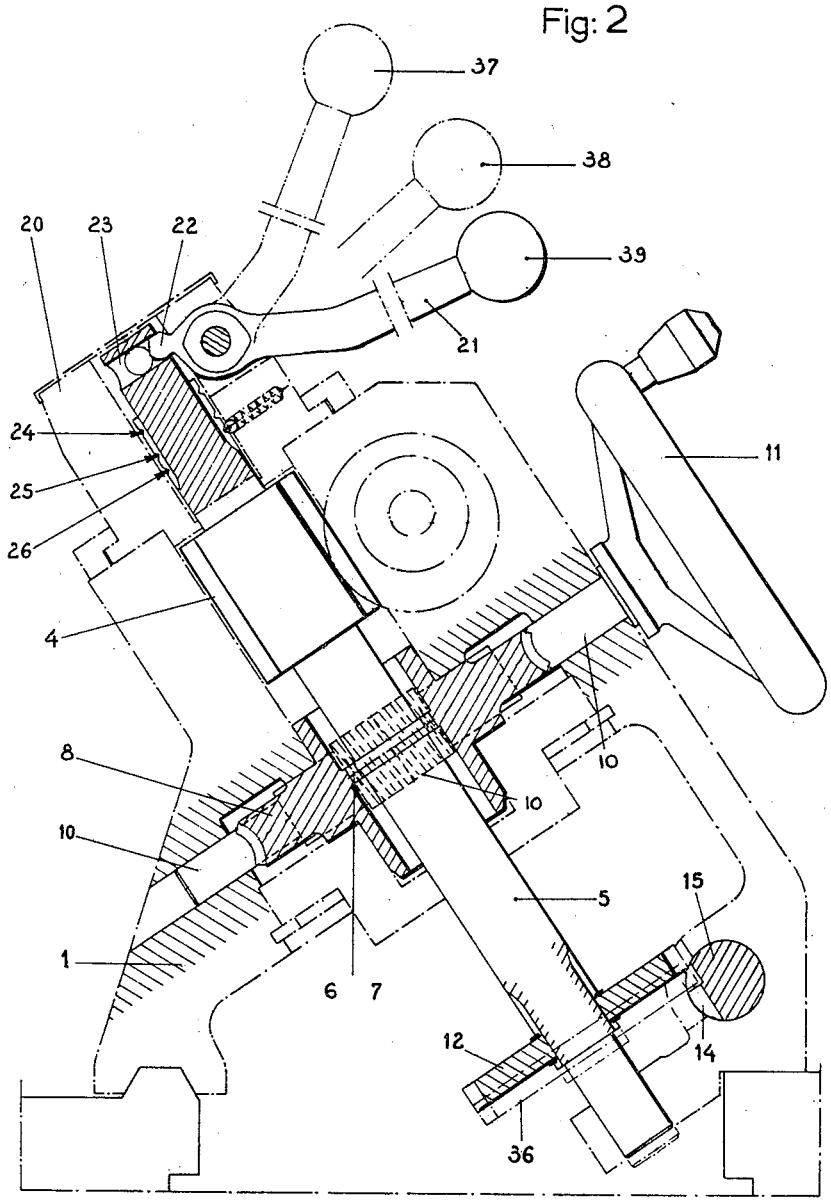
Fig: 2

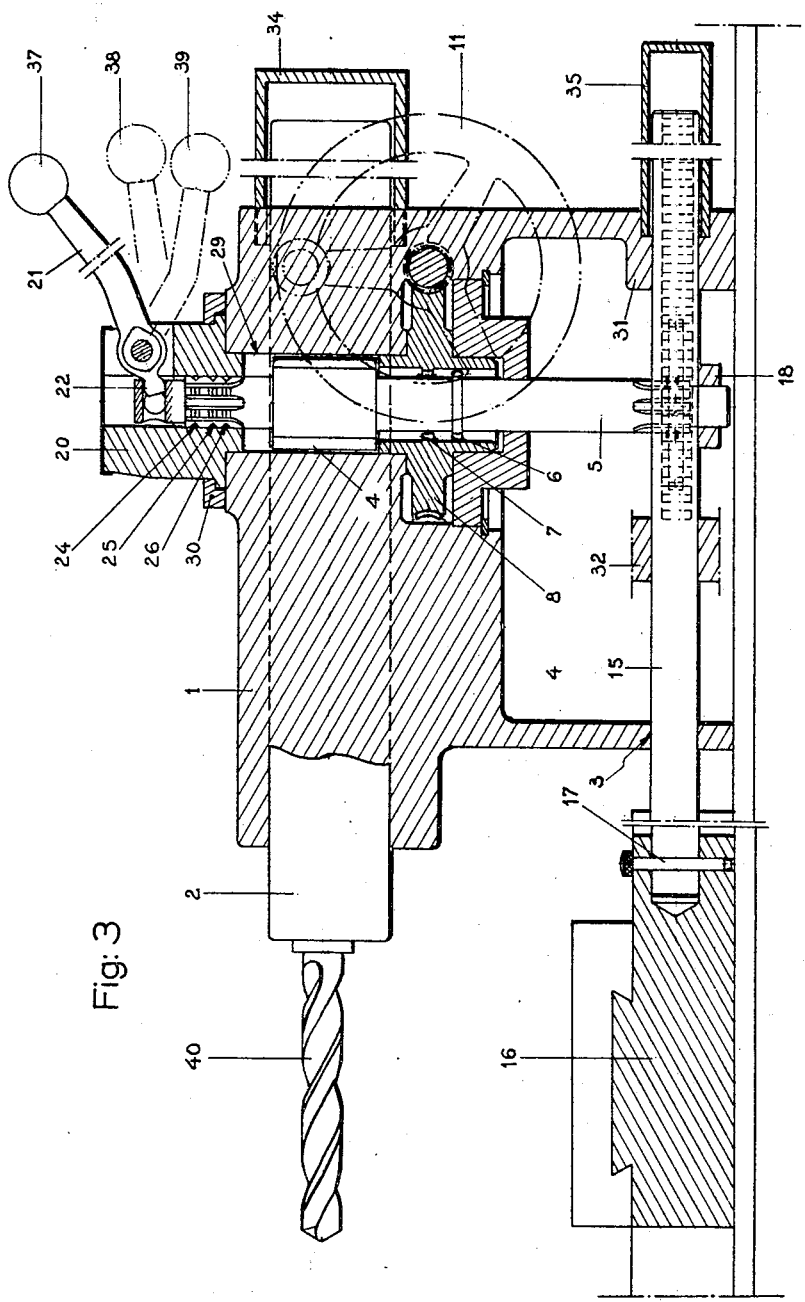

United States Patent Office 2,999,404
Patented Sept. 12, 1961

2,999,404
DRILLING AND THE LIKE ARRANGEMENT
FITTED ON A LATHE TAILSTOCK
Henri René Bruet, Paris, France, assignor to Etablissements A. Cazeneuve, La Plaine Saint-Denis, France, a company of France
Filed July 14, 1959, Ser. No. 827,060
Claims priority, application France July 22, 1958
10 Claims. (Cl. 77—34.6)

The present invention has for its object an arrangement for drilling or machining a part through the agency of a tailstock, chiefly in the case of slide lathes.

Numerous arrangements have already been provided for drilling pieces of work on a lathe through the agency of drills fitted on the tailstock. One of the simplest means consists in coupling the tailstock with the carriage but this leads to serious drawbacks which are well-known to any one skilled in the art.

Now, the present invention has for its object to avoid such drawbacks and to provide a readily operable, sensitive and strong arrangement adapted for all applications, having a small bulk with a reduced number of parts and associated under the best conditions with the conventional parts of the lathe, chiefly the carriage and the feed and thread-cutting boxes.

According to a primary feature of the present invention, the carriage of the lathe is coupled with a draw bar formed with a rack meshing with a pinion keyed to a relay shaft extending preferably in a plane perpendicular to the axis of the lathe and arranged obliquely in its front to rear direction. Said relay shaft carries a second pinion meshing with a second rack formed in the sleeve of the tailstock. The two pinions keyed to the relay shaft have preferably different diameters, the larger pinion meshing with the rack on the draw bar and the smaller pinion meshing with the rack formed on the sleeve so as to form for instance a speed-reducing gear which reduces the tractional effort of the carriage together with the speed of longitudinal movement of the sleeve.

According to a further arrangement which may be associated with the preceding arrangement, the relay shaft carrying the two pinions is shiftable along its axis as provided by at least one lever pivotally secured thereto preferably in annular formation so as to form a capstan through which it is possible to control the rotation of said relay shaft. Said shaft, thus actuated longitudinally by said levers may selectively occupy any one of three characteristic positions for which the sleeve is shifted either automatically when the draw bar is coupled with the carriage or manually when said carriage is disengaged.

The above arrangements are associated with means for coupling the draw bar with the carriage and possibly with the tailstack as described hereinafter.

In the previously described arrangements, the relay shaft is positioned advantageously to the rear of the tailstock and it slopes downwardly from its front to its rear end so that the perimeter of the circle swept by the capstan in its upper position may register preferably with the upper end of the tailstock body.

The detailed description to be found hereinafter and the corresponding accompanying drawings given by way of example and in a non-limiting sense will show further arrangements and will allow a proper understanding of the present invention.

FIG. 1 and 2 are cross-sections of a tailstock incorporating an arrangement according to the invention.

FIG. 3 is a longitudinal cross-section of the arrangement fitted in the tailstock together with its coupling with the carriage.

FIGS. 4 and 5 illustrate two alternative means for securing the draw bar to the carriage.

As shown in FIGS. 1 to 4, the tailstock 1 guides the sleeve 2 provided over a suitable length with a rack 3 formed therein and meshing with a first pinion 4 rigid with the relay shaft 5. The latter is provided with notches 6 adapted to engage corresponding notches 7 formed in the worm wheel 8 driven by the worm 10 controlled by the handwheel 11. To the relay shaft 5 is keyed a second pinion 12 meshing with the rack 14 cut in the draw bar 15 engaging the carriage 16 to which said draw bar is keyed by a preferably removable pin 17.

The relay shaft 5 revolves through its lower end inside a bearing 18 and at its upper end, it carries a series of ribs 19 engaging and guided by corresponding flutings machined in a centering bridge 20 to which are pivotally secured levers such as 21 forming a capstan and the ends 22 of which having a spherical shape engage openings such as 23 bored across the end of the relay shaft 5, the latter being provided with notches 24, 25 and 26 which may be engaged selectively by a ball 27 subjected to the pressure of the spring 28 carried by the centering bridge 20.

The centering bridge 20 guiding the end of the relay shaft 5 is revolubly carried in the bore 29 formed in the tailstock coaxially with the shaft and it is held fast axially by the thrust washer 30.

The relay shaft 5 is arranged so as to allow the tailstock front to extend freely beyond said shaft and also so that the racks 3 and 14 when moving longitudinally in a forward direction remain inside the tailstock to be thus protected against any deposit of shavings, dust and the like waste material.

The protection of the racks 3 and 14 at the rear end of the tailstock is ensured by corresponding sleeves formed by the two tubes 34 and 35, the shape and nature of which are selected as desired.

The above-described arrangement ensures the forward and rearward movements of the tool carried by the sleeve 2 in any of the three following manners.

(1) In the position illustrated in FIGS. 1 and 3, the carriage 16 carries along with it, through the agency of the pin 17 and at a speed defined by the lead or thread-defining boxes on the lathe, the draw bar 15 of which the rack meshing with the second pinion 12 produces a rotation of the relay shaft 5 and of its first pinion 4 which meshes in its turn with the rack 3. This ensures the shifting of the sleeve 2 and of the tools carried by the latter such as drills, blades, taps, or the like, in the same direction as the travel of the carriage 16 and at a speed which, under otherwise equal conditions, depends on the ratio between the pitch diameters of the pinions 4 and 12. In fact, the diameter of the pinion 12 is advantageously selected by way of preference so as to be larger than the diameter of the pinion 4 and to reduce thus, under otherwise similar conditions, the tractional effort to be produced by the carriage 16 together with the speed of progression of the sleeve 2. The arrangement as thus adjusted provides automatic operation.

(2) Upon shifting of the lever 21 from its position 37 into its position 38, the relay shaft 5 is shifted and its notch 25 faces now the ball 27. For such a position, the pinion 12 is disengaged with reference to the rack 14 and assumes the position 36 as illustrated in dot and dash lines in FIG. 2.

The forward and rearward movements of the sleeve 2 and of the tool carried thereby may then be operated by hand by the levers such as 21 forming a capstan around the centering bridge 20. Through this arrangement, it is possible to execute in a highly precise manner, the boring, rolling, machining or tapping of the work through operation of the various tools which may be fitted on the sleeve 2 and this presents considerable advantages when the work to be executed is difficult and when for instance the drills or the taps used have a reduced diameter.

(3) The shifting of the lever 21 from the position 38 to the position 39 brings the notch 26 in the shaft 5 into registry with the ball 27, which holds the relay shaft 5 in the position for which the notched part 6 of the shaft engages the corresponding notches 7 formed in the worm wheel 8. The rotation of the relay shaft 5 may thus be controlled by the handwheel 11 keyed to the worm 10 meshing with the worm wheel 8. This control may be subjected to a considerable speed reduction which may be for instance of the same magnitude as that incorporated with conventional means so as to allow at least the manual execution of a work such as those already referred to.

It is apparent that it is possible to bring the tool onto the axis of the work piece to be machined through the two last-mentioned manual means disclosed at 2 and 3 respectively and of which the former is highly sensitive.

The disengagement of the draw bar 15 may be obtained either through disengagement of the pin 17 or else as described hereinafter through the receding movement of a push member.

In both these cases, the manual control may then be executed by the capstan, the levers remaining in the position 37.

The draw bar 15 may be coupled with the carriage 6 in various manners. Three such coupling arrangements according to the present invention are described hereinafter by way of example and by no means in a limiting sense.

In FIG. 3, the draw bar is coupled with the carriage 16 through the pin 17, which is preferably of a safety type, which may be removed so as to provide independence of the members 15 and 16 with reference to each other.

In FIG. 4 alternatively, a push member 50 may engage a notch 51 formed in the draw bar 15 or be released with reference to the latter through a partial rotation of the handle 52 carried together with the push member 50 by the carriage 16.

In FIG. 5 alternatively, the draw bar 55, which is similar to the draw bar 15 and plays the same part, is coupled elastically with the carriage 16 through suitable elastic means of any description such as Belleville washers or the like. The washers 56 are subjected to a preliminary pressure under a suitable stressing between the plug 57 and the grooved ring 58 engaged by the stud 59 arranged eccentrically with reference to a radial spindle 60 with which it is rigid and to which is keyed a lever 61.

When the tractional effort exerted on the draw bar 55 rises above the predetermined stressing for which the washer has been adjusted, the draw bar 55 moves axially and the eccentric stud 59 engaging the grooves 58 produces a rocking of the lever 61 which may for instance produce a stoppage of the carriage 16.

In association with said coupling means, there is provided an engagement or disengagement of the draw bar such as 15 or 55 with reference to the body of the movable tailstock. To this end, a push member 62 is adapted to engage a notch 63 formed in the draw bar 15 (FIG. 4) and it may be released through a reverse movement. This auxiliary coupling system allows automatically shifting the tailstock at the speed allowed by the carriage 16.

It will be remarked that the arrangement according to the present invention allows among other important advantages an almost instantaneous passage from automatically controlled operation to manually controlled operation through a mere shifting of the lever 21, from its position 37 into the position 38.

Obviously, the present invention is by no means limited to the arrangements disclosed which are given by way of a mere exemplification and its covers all similar arrangements incorporating the subject-matter of the accompanying claims and it covers also all machines with the mechanisms described hereinabove and falling within the scope of said accompanying claims.

What I claim is:

1. In a lathe including a carriage and a tailstock, the provision of a machining system comprising a sleeve slidably carried inside said tailstock and extending longitudinally of the latter, and adapted to carry a tool, a first rack rigid with the outer surface of the sleeve, longitudinally of the latter, a relay shaft slidably and revolubly carried in the tailstock, its axis lying in a transverse plane of the latter, locking means for immobilizing said tailstock during cutting operation, a first pinion and a second pinion keyed to said relay shaft and of which the first pinion meshes with the rack on the sleeve and the second pinion is keyed to one end of the relay shaft, a draw bar operatively connected with the latter carriage, and a second rack carried by said draw bar, parallel with the longitudinal axis of the tailstock and adapted to mesh with the second pinion.

2. In a lathe including a carriage and a tailstock, the provision of a machining system comprising a sleeve slidably carried inside said tailstock, extending longitudinally of the latter and adapted to carry a tool, a rack rigid with the outer surface of the sleeve, longitudinally of the latter, a relay shaft slidably and revolubly carried in the tailstock, its axis lying in a transverse plane of the latter, locking means for immobilizing said tailstock during cutting operation, a first pinion and a second pinion keyed to said relay shaft and of which the first pinion meshes with the rack on the sleeve and the second pinion is keyed to one end of the relay-shaft, and has a larger diameter than the first pinion, a draw bar operatively connected with the lathe carriage, a second rack carried by said draw bar, parallel with the longitudinal axis of the tailstock and adapted to mesh with the second pinion.

3. In a lathe including a carriage and a tailstock, the provision of a machining system comprising a sleeve slidably carried inside said tailstock, extending longitudinally of the latter and adapted to carry a tool, a rack rigid with the outer surface of the sleeve, longitudinally of the latter, a guiding member, revolubly carried in the tailstock, its axis lying in a transverse plane of the latter, a relay shaft slidingly and coaxially carried through one end inside the guiding member, means constraining said guiding member to rotate in unison with the relay shaft, at least one lever pivotally secured to said guiding member to rock in an axial plane thereof means actuatable by said lever for shifting said member angularly, means actuatable by the rocking of the levers shifts the relay shaft axially, locking means for immobilizing said tailstock during cutting operation, a first pinion and a second pinion keyed to said relay-shaft and of which the first pinion meshes with the rack on the sleeve and the second pinion is keyed to the other end of the relay shaft, a draw bar operatively connected with the lathe carriage, a second rack carried by said draw bar, parallel with the longitudinal axis of the tailstock and adapted to mesh with the second pinion for a predetermined axial position of the relay shaft.

4. In a lathe including a carriage and a tailstock, the provision of a machining system comprising a sleeve slidably carried inside said tailstock, extending longitudinally of the latter and adapted to carry a tool, a rack rigid with the outer surface of the sleeve, longitudinally of the latter, a relay shaft slidably and revolubly carried in the tailstock, its axis lying in a transverse plane of the latter, locking means for immobilizing said tailstock during cutting operation, a first pinion and a second pinion keyed to said relay-shaft and of which the first pinion meshes with the rack on the sleeve and the second pinion is keyed to one end of the relay-shaft, a draw bar operatively connected with the lathe carriage, a second rack carried by said draw bar, parallel with the longitudinal axis of the tailstock and adapted to mesh with the second pinion for a predetermined position of the relay-shaft, means for longitudinally shifting the relay shaft, a handwheel, a worm keyed to the handwheel, a worm gear meshing with said worm and adapted to operate the relay shaft for a further predetermined longitudinal position of the latter.

5. In a lathe including a carriage and a tailstock, the provision of a machining system comprising a sleeve slidably carried inside said tailstock, longitudinally of the latter, and adapted to carry a tool, a rack rigid with the outer surface of the sleeve, longitudinally of the latter, a guiding member revolubly carried in the tailstock, its axis lying in a transverse plane of the latter, a relay shaft slidingly and coaxially carried through one end inside the guiding member, means constraining said guiding member to rotate in unison with the relay shaft, at least one lever pivotally secured to said guiding member to rock in an axial plane thereof, means actuatable by said lever for shifting said member angularly, means actuatable by the rocking of the levers shifts the relay shaft axially, a first pinion and a second pinion keyed to said relay shaft and of which the first pinion meshes with the rack on the sleeve and the second pinion is keyed at the other end of the relay shaft, a draw bar operatively connected with the lathe carriage, a second rack carried by said draw bar, parallel with the longitudinal axis of the tailstock and adapted to mesh with the second pinion for a predetermined axial position of the relay shaft, a handwheel, a worm keyed to said handwheel, and a worm gear meshing with said worm and adapted to operate the relay shaft for a further predetermined longitudinal position of the latter.

6. In a lathe including a carriage and a tailstock, the provision of a machining system comprising a sleeve slidably carried inside said tailstock, extending longitudinally of the latter and adapted to carry a tool, a rack rigid with the outer surface of the sleeve, longitudinally of the latter, a guiding member revolubly carried in the tailstock, its axis lying in a transverse plane of the latter and sloping with reference to verticality, a relay shaft slidingly and coaxially carried through one end inside the guiding member, means constraining said guiding member to rotate in unison with the relay shaft, at least one lever pivotally secured to said guiding member to rock in an axial plane thereof means actuatable by said lever for shifting said member angularly, means actuatable by the rocking of the levers shifts the relay shaft axially, a first pinion and a second pinion keyed to said relay shaft and of which the first pinion meshes with the rack on the sleeve and the second pinion is keyed to the other end of the relay shaft, a draw bar operatively connected with the lathe carriage, and a second rack carried by said draw bar, parallel with the longitudinal axis of the tailstock and adapted to mesh with the second pinion for a predetermined axial position of the relay shaft.

7. In a lathe including a carriage and a tailstock, the provision of a machining system comprising a sleeve slidably carried inside said tailstock and extending longitudinally of the latter, and adapted to carry a tool, a rack rigid with the outer surface of the sleeve, a longitudinally of the latter, a relay shaft slidably and revolubly carried in the tailstock, its axis lying in a transverse plane of the latter, a first pinion and a second pinion keyed to said relay shaft and of which the first pinion meshes with the rack on the sleeve and the second pinion is keyed to one end of the relay shaft, a draw bar, a second rack carried by said draw bar and parallel with the longitudinal axis of the tailstock and adapted to mesh with the second pinion, and a retractable push member having a finger adapted to engage a notch in the draw bar to rigidly secure the latter to the lathe carriage.

8. In a lathe including a carriage and a tailstock, the provision of a machining system comprising a sleeve slidably carried inside said tailstock, extending longitudinally of the latter and adapted to carry a tool, a rack rigid with the outer surface of the sleeve, longitudinally of the latter, a relay shaft slidably and revolubly carried in the tailstock, its axis lying in a transverse plane of the latter, a first pinion and a second pinion keyed to said relay shaft and of which the first pinion meshes with the rack on the sleeve and the second pinion is keyed to one end of the relay shaft, a draw bar, a second rack carried by said draw bar, parallel with the longitudinal axis of the tailstock and adapted to mesh with the second pinion and a pin rigidly and removably securing the draw bar to the lathe carriage.

9. In a lathe including a carriage and a tailstock, the provision of a machining system comprising a sleeve slidably carried inside said tailstock and extending longitudinally of the latter and adapted to carry a tool, a rack rigid with the outer surface of the sleeve, longitudinally of the latter, a relay shaft slidably and revolubly carried in the tailstock, its axis lying in a transverse plane of the latter, a first pinion and a second pinion keyed to said relay shaft and of which the first pinion meshes with the rack on the sleeve and the second pinion is keyed to one end of the relay shaft, a draw bar, a second rack carried by said draw bar, parallel with the longitudinal axis of the tailstock and adapted to mesh with the second pinion and resilient means connecting said draw bar with the lathe carriage.

10. In a lathe including a carriage and a tailstock, the provision of a machining system comprising a sleeve slidably carried inside said tailstock and extending longitudinally of the latter and adapted to carry a tool, a rack rigid with the outer surface of the sleeve, longitudinally of the latter, a relay shaft slidably and revolubly carried in the tailstock, its axis lying in a transverse plane of the latter, a first pinion and a second pinion keyed to said relay shaft and of which the first pinion meshes with the rack on the sleeve and the second pinion is keyed to one end of the relay shaft, a draw bar operatively connected with the lathe carriage, a second rack carried by said draw bar, parallel with the longitudinal axis of the tailstock and adapted to mesh with the second pinion and retractable means engageable with a notch in said draw bar and adapted to secure said draw bar to the tailstock.

References Cited in the file of this patent

UNITED STATES PATENTS

| | | |
|---|---|---|
| 1,522,124 | Hoisington | Jan. 6, 1925 |
| 2,554,102 | Globash et al. | May 22, 1951 |
| 2,841,039 | Stastny | July 1, 1958 |